(12) United States Patent
Stiller

(10) Patent No.: US 7,441,782 B2
(45) Date of Patent: Oct. 28, 2008

(54) METHOD FOR CONTROLLING THE LEVEL OF PNEUMATIC LEVEL CONTROL SYSTEMS IN MOTOR VEHICLES

(75) Inventor: Alexander Stiller, Garbsen (DE)

(73) Assignee: Continental Aktiengesellschaft, Hannover (DE)

( * ) Notice: Subject to any disclaimer, the term of this patent is extended or adjusted under 35 U.S.C. 154(b) by 301 days.

(21) Appl. No.: 10/564,309

(22) PCT Filed: Apr. 28, 2004

(86) PCT No.: PCT/EP2004/004493

§ 371 (c)(1),
(2), (4) Date: Jun. 23, 2006

(87) PCT Pub. No.: WO2005/005181

PCT Pub. Date: Jan. 20, 2005

(65) Prior Publication Data

US 2007/0040344 A1 Feb. 22, 2007

(30) Foreign Application Priority Data

Jul. 12, 2003 (DE) .............................. 103 31 600

(51) Int. Cl.
*B60G 17/00* (2006.01)
(52) U.S. Cl. .................. 280/6.153; 280/6.15
(58) Field of Classification Search ............... 280/6.15, 280/6.153, 6.154, 5.501, 5.502
See application file for complete search history.

(56) References Cited

U.S. PATENT DOCUMENTS

| 3,684,416 A | | 8/1972 | Lenk | |
| 4,247,126 A | * | 1/1981 | Claxton | 280/6.155 |
| 4,462,610 A | | 7/1984 | Saito et al. | |
| 5,130,927 A | | 7/1992 | Kunishima et al. | |
| 5,168,415 A | | 12/1992 | Osuga | |
| 5,261,691 A | | 11/1993 | Laichinger et al. | |
| 6,983,201 B2 | * | 1/2006 | Misawa | 701/37 |
| 7,066,474 B2 | * | 6/2006 | Hiebert et al. | 280/6.153 |
| 7,104,547 B2 | * | 9/2006 | Brookes et al. | 280/6.153 |

FOREIGN PATENT DOCUMENTS

| DE | 4333591 A1 | 4/1995 |
| DE | 19621946 C2 | 9/1997 |

* cited by examiner

*Primary Examiner*—Eric Culbreth
*Assistant Examiner*—Nicole Verley

(57) ABSTRACT

A method controls the level of a pneumatic level-control system of a motor vehicle including at least two axles, at least one pneumatic spring (2a, 2b) per axle, optionally one or more pressure accumulators (3), at least one pressure sensor (24), elements (16, 18, 20, 22) for determining the distance between at least one wheel and/or an axle and the vehicle body, a control unit (10) and a compressor (12). The axle levels are controlled in sequence and adjusted from a starting level to a target level. During a positive adjustment operation the compressor (12) is at least operated temporarily and/or a connection of at least one pneumatic spring (2a, 2b) to the pressure accumulator (3) is established. The positive adjustment operation for the pneumatic spring or springs (2a, 2b) on an axle from a starting level to a higher target level is interrupted by the control unit (10), if at least one shut-off condition of the compressor (12) has been fulfilled and/or the pressure level is too low in the pressure accumulator (3). To prevent the vehicle from leaning, after the interruption of the positive adjustment operation, the level in all axles is adjusted to a common intermediate level, which is closer to the target level than to the starting level.

10 Claims, 2 Drawing Sheets

METHOD FOR CONTROLLING THE LEVEL OF PNEUMATIC LEVEL CONTROL SYSTEMS IN MOTOR VEHICLES

BACKGROUND OF THE INVENTION

The invention relates to method for level control in a pneumatic level control of a motor vehicle having at least two axles, at least one air spring per axle, if appropriate one or more pressure accumulators, at least one pressure sensor, means for determining the distance between at least one wheel and/or axle and the vehicle body, a control unit and a compressor. The axles are successively adjusted from a starting level to a desired level. During a positive-adjustment operation, at least from time to time the compressor is operated and/or a connection is established between at least one air spring and the pressure accumulator. The positive-adjustment operation of the air spring or air springs on an axle from a starting level to a higher desired level is interrupted by the control unit if at least one switch-off condition of the compressor has been fulfilled and/or the pressure level in the pressure accumulator is too low.

A method for level control in a pneumatic level control system of a motor vehicle of the type described in the introduction is known for example from DE 196 21 946 C2. This document describes a pneumatic suspension of a motor vehicle which allows the level of the vehicle to be raised or lowered in situ or to be kept at a predetermined level irrespective of the load level. A control unit which switches the compressor on and off comprises a computer, which calculated an estimated value for an operating temperature of the compressor and switches it off if the estimated value exceeds an upper threshold value. The control unit or computer switches the compressor on again if the estimated value drops below a lower threshold value. In each case the last estimated value is increased by a predetermined temperature rise when switching on the compressor; the degree of this predetermined temperature rise is dependent on the magnitude of the estimated value. While the compressor is operating, the estimated value is increased by a positive gradient, and when the compressor is inoperative it is reduced by a negative gradient.

DE 43 33 591 A1 has disclosed a motor controller which switches off the motor or the driven compressor for a predeterminable time based on the total on time and thereby protects the motor/compressor from overheating.

DE 40 30 475 A1 has disclosed a method for controlling a motor in which the starting point is the rising or falling temperature characteristic curve of the motor during operation or standstill, respectively. The method involves estimating an instantaneous value for the temperature of the motor by monitoring the operating time or the time for which the motor has been inoperative. If the estimated instantaneous value exceeds a predeterminable value, motor operation is stopped and an alarm signal is emitted.

The prior art has disclosed methods for level control in level control systems for motor vehicles which can be used to estimate the temperature of a motor or a compressor during operation without exceeding a predetermined limit value. This allows the compressor to be reliably protected from overheating. It is also known to fill an air spring with compressed air from a pressure accumulator and thereby to raise the level of the vehicle. The situation may arise whereby the pressure level in the pressure accumulator is insufficient to fill the air spring with the required volume of air which is necessary for the desired level to be set. This situation arises, for example, if the pressure level in the pressure accumulator is equal or approximately equal to the pressure level of the air spring and there is no longer any exchange of air between the pressure accumulator and the air spring. It is known from the prior art to combine the positive adjustment method with compressor and pressure accumulator, so that the pressure level in the pressure accumulator can be increased again by the compressor.

The methods described above have the drawback that a positive adjustment operation to a predetermined desired level is interrupted if the limit or threshold value is reached. Since the axles of a vehicle are normally adjusted successively from the starting level to the desired level, the situation may arise whereby one or, in particular in the case of trucks, more axles have reached the desired level, whereas the axle which is yet to be adjusted no longer reaches the desired level, on account of the switch-off condition being triggered, leading to the motor vehicle adopting a leaning position. To compensate for the leaning position, it is known from the prior art for all the axles to be adjusted negatively down to the starting level.

To prevent the motor vehicle from leaning, it is known from the prior art to lower the level at all the axles to the starting level, so that the original level before the positive adjustment operation commenced is set. While the compressor operation is switched off, the compressor can cool down, which can take a very long time under certain circumstances. The positive adjustment operation is restarted either automatically or based on a request from the driver (actuation of a button) if a switch-on condition of the compressor is fulfilled. In unfavourable situations, for example under extreme ambient conditions, it may be the case that the cooling of the compressor based on the switch-on condition is insufficient to adjust the motor vehicle from the starting level to the desired level, and a further positive-adjustment operation is again interrupted by the switch-off condition.

It is an object of the invention to provide a method for controlling the level in level control systems for motor vehicles which lowers the energy consumption, reduces the switching frequency of the corresponding components and allows the desired level to be reliably reached even under extreme ambient conditions.

SUMMARY OF THE INVENTION

According to the invention, this object is achieved by adjusting the level at all the axles of the motor vehicle to a common height intermediate level which is closer to the desired level than the starting level.

The switch-off condition defined for the compressor may either be a temperature limit value, a time limit value or a current limit value. If a temperature limit value is defined as the switch-off condition, the temperature of the compressor can be measured directly at the compressor or in the vicinity of the compressor with the aid of a temperature sensor. Otherwise, the temperature can be estimated with the aid of methods as are known for example from DE 196 21 946 C2, DE 43 33 591 A1 or DE 40 30 475 A1. Alternatively, a time limit value can be monitored as the switch-off condition. In this case, the control unit monitors the time for which a compressor has been switched on, for example by means of a counter. Alternatively, a current limit value of the compressor motor is defined as the switch-off condition and is determined by the control unit, for example by means of a signal from a current-measuring coil.

The positive-adjustment operation of an air spring from the pressure accumulator can be interrupted on the basis of the pressure level in the pressure accumulator being too low. This is the case if the pressure drop between pressure accumulator and corresponding air spring is too low to raise the level at the air spring. In this case, it is preferable for a threshold value for the pressure level in the pressure accumulator to be set for example in the control unit, with a drop in the pressure in the pressure accumulator to below this pressure threshold being recorded and made available for further processing.

If, during a positive-adjustment operation, the switch-off condition of the compressor is triggered or the pressure level in the pressure accumulator drops below the pressure threshold, compressor operation switched off or the connection between the air spring(s) and the pressure accumulator is interrupted and the level at all the axles of the motor vehicle is adjusted to the intermediate level, the intermediate level being higher than the starting level. This ensures that the level of the motor vehicle rises compared to the starting level if the positive-adjustment operation of the last axle to be controlled (in the case of passenger automobiles, this generally means the rear axle in the case of positive adjustment) has been at least partially carried out. This allows the desired level to be reached even under extreme ambient conditions, since at least a slight increase in level to the intermediate level compared to the starting level is always carried out. Another advantage of the invention is that the frequency with which and time for which the compressor, including the motor and the corresponding valves, is switched on can be reduced, since a further positive-adjustment operation only needs to take place from the intermediate level to the desired level. Energy is saved as a result of the compressor running time then being shorter.

According to a refinement of the invention, it is provided that the intermediate level after the positive-adjustment operation at an axle has been terminated and before the adjustment operation to this common height intermediate level begins is determined. The common height intermediate level is determined on the basis of data relating to the individual air springs which are present during or after the interruption to the positive-adjustment operation. Examples of air-spring-specific data include the current pressure in the air springs, the air spring volume and the current level height at the vehicle corner or axle of the corresponding air spring. The advantage of this refinement of the invention is that the intermediate level can be deliberately controlled and adjusted, which shortens the adjustment time and prevents unnecessary switching operations on the part of the cross-blocking valves.

According to a refinement of the invention, it is provided that the intermediate level corresponds to the lowest actual level of one of the axles of the motor vehicle. If the switch-off condition of the compressor is triggered during a positive-adjustment operation and the compressor operation is switched off, the level of all the axles of the motor vehicle is lowered to the lowest actual value of one of the axles. The advantage of this refinement of the invention is that the lowest actual level of all the axles can be determined in a simple way, in particular by the control unit evaluating the height signals from the height sensors.

According to a refinement of the invention, the intermediate level is set on the basis of air exchange between the corresponding air springs of the respective axles of the motor vehicle, without air being released from the corresponding air springs of the level control system to the environment. The advantage of this refinement of the invention is that there is no unnecessary generation of compressed air, and consequently energy is saved. If a different pressure level is present in the individual air springs of the respective axles, it is advantageous first of all to increase the level of the axle with the highest pressure in the air springs. The sequence can be continued accordingly if the motor vehicle has more than two axles as soon as the respective axle has reached the desired level. A general precondition for this refinement is that both the pressure level and the height level at one axle or in the air springs of this axle must be greater than or equal to the pressure level and height level of the other axle(s) or the air springs of said axle(s) ($p_1 \geq p_2$ and $h_1 \geq h_2$), in order to allow air exchange and accordingly height compensation between them.

If the positive-adjustment operation at an axle is interrupted on account of the switch-off condition of the compressor and/or the pressure level in the pressure accumulator being too low, it is possible for the air from the air springs of the axle(s) at the higher pressure which has already been positively adjusted to be gradually transferred into the air springs of the axle(s) which has/have been only partially positively adjusted to the desired level, or has/have not been positively adjusted to the desired level, until all the axles reach the same level. This operation is controlled by the control unit. The control unit in each case opens the solenoid valves of the corresponding air springs jointly for only a short time, so that air can flow from the air spring at the higher pressure into the air spring at the lower pressure. There are short pauses between the joint opening phases of the corresponding valves, in order to allow pressure equalization and to allow the respective pressure in the air springs and the level of the individual axles to be determined.

According to a refinement of the invention, the positive-adjustment operation of an air spring or of the air springs at the axles which has been interrupted is continued automatically to the desired level if a switch-on condition of the compressor is fulfilled, with the intermediate level corresponding to the starting level. The desired level requirement is stored in the control unit. The desired level is available in the control unit even after the switch-off condition of the compressor has been triggered, the positive-adjustment operation has been interrupted and the subsequent negative-adjustment operation of the corresponding axles has ended. The benefit of this refinement of the invention is that the positive-adjustment operation to the desired level is continued as soon as the switch-on condition of the compressor is fulfilled. As a result, the desired level is reached as quickly as possible, without unnecessary time loss. If the positive-adjustment operation of a vehicle axle from the pressure accumulator was interrupted on account of the pressure being too low, it is preferable for the positive-adjustment operation at the axle to be continued by the compressor first of all as soon as the switch-on condition for the compressor is fulfilled. Only afterward is the pressure level of the pressure accumulator increased to the extent required.

According to a refinement of the invention, it is provided that the switch-off condition for the compressor is an upper limit temperature. The limit temperature may either be measured directly or determined using known estimation methods. The advantage of this refinement of the invention is that the upper limit temperature allows a simple and direct relationship to be established with possible damage to components of the compressor.

According to a refinement of the invention, it is provided that the upper limit temperature is determined directly at the compressor or in the vicinity of the compressor. The advantage of this refinement of the invention is that determining the upper limit temperature at the compressor or in the vicinity of the compressor allows a simple and direct relationship to be established with the possibility of damage to components of the compressor.

According to a refinement of the invention, it is provided that the switch-on condition for the compressor is a lower limit temperature. The advantage of this refinement of the invention is that determining the lower limit temperature allows a simple and direct relationship to be established with the cooling properties of the compressor. Determining a lower limit temperature at a specific point correlates with the critical component temperatures of the compressor. According to a refinement of the invention, it is provided that the lower limit temperature is determined directly at the compressor (12) or in the vicinity of the compressor. The advantage of this refinement of the invention is that determining the lower limit temperature allows a simple and direct relationship to be established with the cooling properties of the compressor. Determining a lower limit temperature at a specific point at the compressor or in the vicinity of the compressor correlates with the critical component temperatures of the compressor to a sufficient extent for it to be possible for the compressor to be switched on again without being damaged until the upper limit temperature is reached.

According to a refinement of the invention, it is provided that the switch-off condition is a pressure threshold value for the pressure in the pressure accumulator. If the pressure level in the pressure accumulator drops below the pressure threshold value, the switch-off condition is triggered and the positive-adjustment operation of the vehicle axle from the pressure accumulator is interrupted. The advantage of this refinement of the invention is that the pressure level in the pressure accumulator and therefore the pressure threshold value can be determined in a simple way and without additional means, for example by means of a pressure sensor or the like.

According to the invention it is provided that a common height intermediate level for all the axles or all the air springs with respect to the vehicle body, which is closer to the desired level than the starting level, is determined in the control unit of the level control system, and in that the level at all the axles or air springs of the motor vehicle is adjusted to the common height intermediate level, so that the vehicle is no longer leaning. This ensures that the level of the motor vehicle rises compared to the starting level if the positive-adjustment operation of the last axle to be adjusted has been at least partially carried out. Consequently, the desired level can be reached even under extreme ambient conditions, since at least a slight increase in level to the intermediate level compared to the starting level is always carried out. Another advantage of the invention is that the frequency with which and the time for which the compressor, including the motor and the corresponding valves, is switched on can be reduced, since a further positive-adjustment operation only needs to take place from the intermediate level to the desired level. Energy is saved on account of the compressor running time then being shorter.

According to a refinement of the invention, it is provided that the level control system carries out a method as described above. The advantage of this refinement of the invention is that the intermediate level can be controlled and adjusted in a targeted way, which shortens the adjustment time and prevents unnecessary switching operations on the part of the cross-blocking valves. The compressor running time is shortened, and therefore energy is saved.

According to a refinement of the invention, it is provided that a temperature sensor is arranged on the cylinder head of the compressor or outside or inside the compressor motor directly on the motor. The advantage of this refinement is that the temperature sensor is positioned directly on or in the vicinity of the temperature-sensitive components of the compressor. This makes it easy to protect the components of the compressor from overheating and destruction. Another advantage of this refinement of the invention is that the temperature which is measured at the selected point produces a calculable relationship to all the heat-sensitive components of the compressor. Consequently, a single temperature-measurement point can be used to reliably protect all the temperature-sensitive components of the compressor from overheating.

Exemplary embodiments and further advantages of the invention are explained in conjunction with the following figures.

DETAILED DESCRIPTION OF THE DRAWINGS

Figure 1:
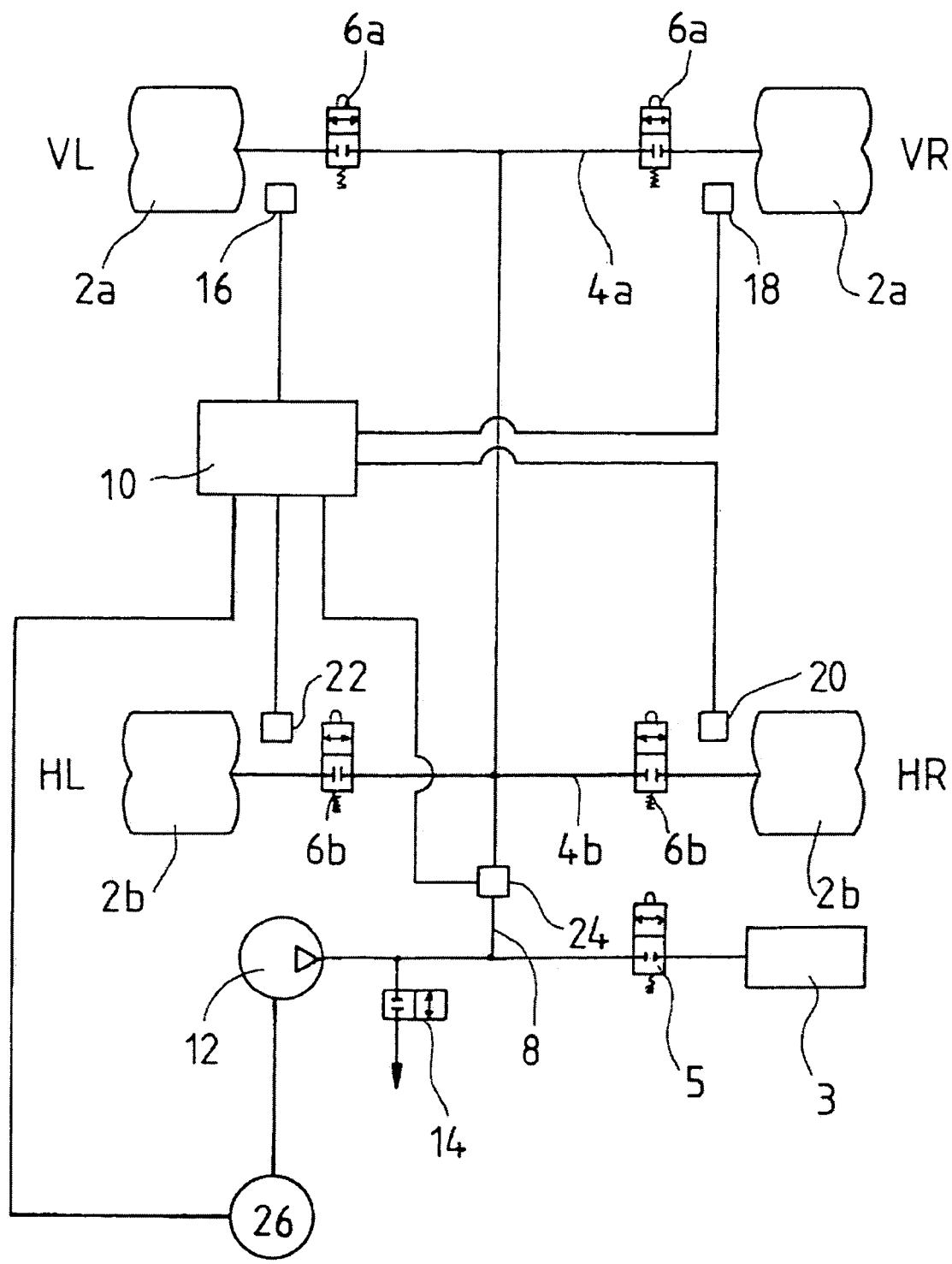
FIG. 1 diagrammatically depicts a level control system.

FIG. 1 shows a highly diagrammatic illustration of a level control system for a motor vehicle, with only the components which are required for the explanations given below being shown. Level control systems of this type are known per se, and consequently require only brief explanation at this point. The level control system has air springs 2a which are assigned to the front axle of the motor vehicle and air springs 2b which are assigned to the rear axle of the motor vehicle. A vehicle body (not shown) of the motor vehicle is mounted in sprung fashion by means of the air springs 2a, 2b. The air springs 2a are connected to one another via a cross-line 4a, and the air springs 2b are connected to one another via a cross-line 4b. Each cross-line 4a, 4b includes two cross-blocking valves 6a, 6b, one assigned to each air spring 2a, 2b. Furthermore, the cross-lines 4a, 4b are connected to a further line 8, via which the air springs 2a, 2b are filled with compressed air and/or via which compressed air is discharged from the air springs 2a, 2b. A pressure accumulator 3 is connected to the line 8 via a cross-blocking valve 5, so that the pressure accumulator 3 can be connected to the air springs 2a, 2b when the cross-blocking valves 5, 6a, 6b are in a suitable switching position or can be connected to the compressor 12 when the cross-blocking valve 5 is correspondingly connected through to it.

To fill the air springs 2a, 2b, the cross-blocking valves 6a, 6b are actuated by the control unit 10 of the level control system in such a way that they move from the at-rest position shown in FIG. 1 into their other switching position and "connect through" the cross-lines 4a and 4b. Then, the compressor 12 is actuated by the control unit 10 so that it delivers compressed air into the air springs 2a, 2b. To terminate the filling operation, the compressor 12 is stopped by the control unit 10 and the cross-blocking valves 6a, 6b are actuated by the control unit 10 so that they adopt the at-rest state shown in FIG. 1. In a corresponding way, the pressure accumulator 3 can also be filled with compressed air by the compressor 12 when the cross-blocking valve 5 is switched through. With the cross-blocking valve 5 switched through, it is also possible for the pressure in the pressure accumulator 3 to be determined by a pressure sensor 24. The pressure signal is transmitted from the pressure sensor 24 to the control unit 10 for further processing (setting the pressure threshold).

To discharge compressed air from the air springs 2a, 2b, the cross-blocking valves 6a, 6b are actuated by the control unit 10 in such a way that they move from the at-rest position shown in FIG. 1 into the open switching position. Furthermore, the control unit 10 actuates the discharge valve 14, so that it moves from the at-rest position shown in FIG. 1 into the open switching position, in which it connects the line 8 to atmosphere. The air springs 2a, 2b are then connected to atmosphere via the cross-blocking lines 4a, 4b and via the line 8, so that compressed air is discharged from them. To terminate or interrupt a discharge operation, the cross-blocking valves 6a, 6b and the discharge valve 14 are closed by the control unit 10, so that they move back into the at-rest position shown in FIG. 1.

The filling or discharge takes place on an axle-by-axle basis on account of different axle loads and consequently different pressures in the air springs.

By corresponding actuation of the cross-blocking valves 6a, 6b and the discharge valve 14, it is also possible for compressed air to be discharged from one air spring or any desired combination of air springs (for example the air springs assigned to one axle). To discharge compressed air from the air spring 2b which is assigned to the "rear left" wheel position, for example, the cross-blocking valve 6b assigned to this air spring 2b and the discharge valve 14 have to be moved from the at-rest position shown in FIG. 1 into the open switching position. If air is additionally to be discharged from the air spring 2b assigned to the "rear right" wheel position, the cross-blocking valve 6b assigned to this air spring 2b additionally has to be moved from the at-rest position shown in FIG. 1 into the other switching position.

In addition to the components which have been mentioned thus far, the level control system also has height sensors 16, 18, 20 and 22, each of which is assigned to one air spring 2a, 2b of the level control system. The current level of the vehicle body in the region of the "front left" wheel position with respect to a reference point can be measured at any time with the aid of the height sensor 16. The same applies to the height sensors 18, 20 and 22. The current level measured by the height sensors 16, 18, 20 and 22 is transmitted from the sensors to the control unit 10 of the level control system, where it is evaluated.

Therefore, the control unit 10 at any time has available to it information as to the current level of the vehicle body in the region of the wheel positions of the motor vehicle with respect to a predetermined reference point. Furthermore, it is possible to determine in the control unit 10 the current level of the vehicle body with respect to an axle of the motor vehicle on average, by forming an average of the measured values from the corresponding height sensors. For example, if the level of the vehicle body with respect to the rear axle is to be determined, the control unit 10 forms an average from the measured values which have been transmitted from the height sensors 20 and 22 to the control unit 10.

The control unit 10 checks on an ongoing basis whether the current level of the vehicle body in the region of a wheel position or the current level of the vehicle body with respect to an axle of the motor vehicle corresponds to a predetermined desired level stored in the control unit 10 (the current level is to be understood as meaning the most recent level received in the control unit 10 on the basis of the measurement signals transmitted from the height sensors 16, 18, 20 and 22). If the current level is below the predetermined desired level stored in the control unit 10, the control unit 10 initiates a positive-adjustment operation. For this purposes, the corresponding cross-blocking valves 6a 6b and the compressor 12 or the cross-blocking valve 5 of the pressure accumulator 3 are switched. The positive-adjustment operation has ended when the control unit 10 ascertains that the current level corresponds to the predetermined desired level stored in the control unit 10. The control unit 10 then moves the corresponding cross-blocking valves 5, 6a, 6b back into the at-rest position shown in FIG. 1 and if necessary switches off the compressor 12.

Figure 2:
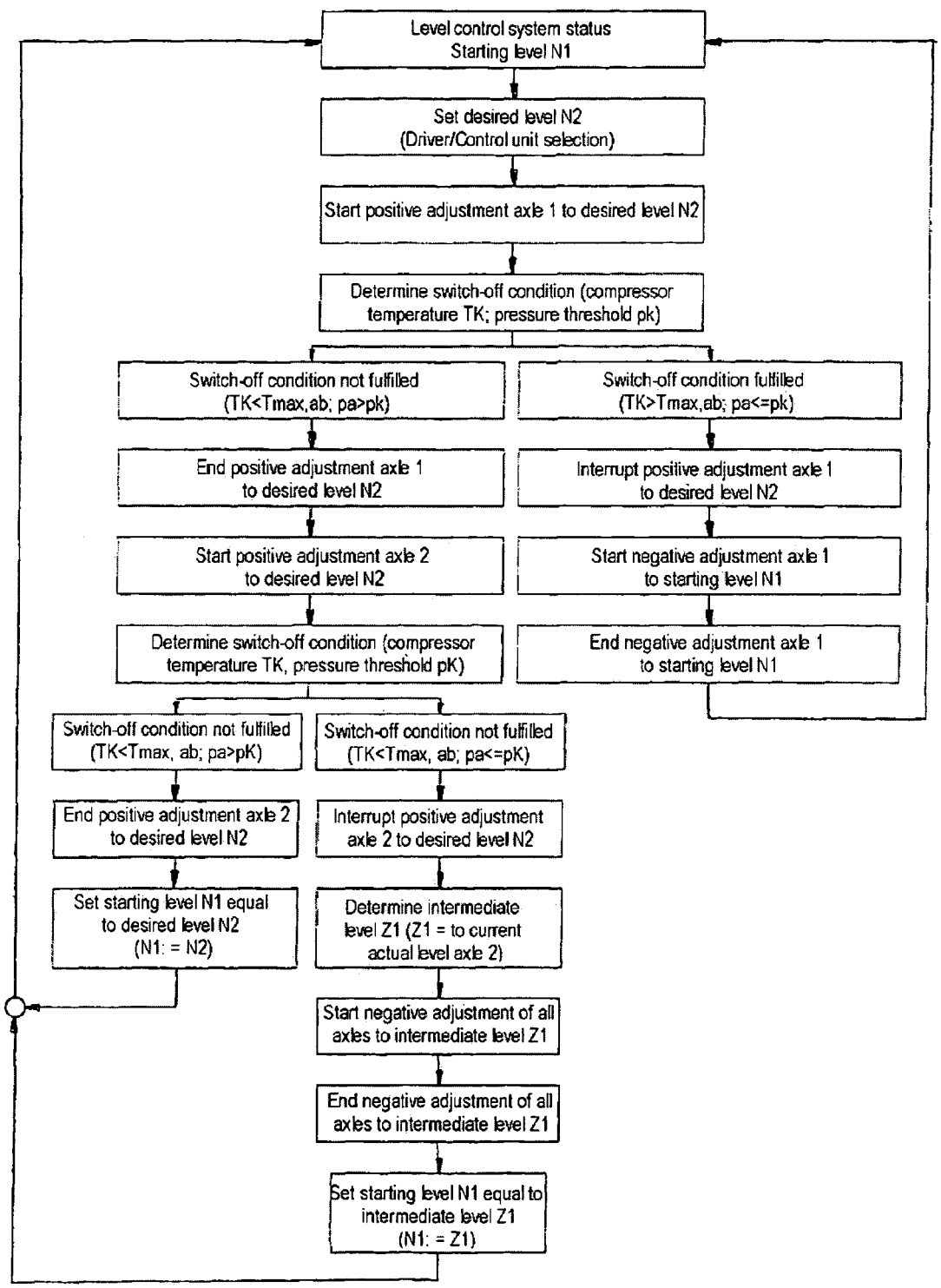
FIG. 2 shows the flow diagram of a level control method.

If the switch-off condition of the compressor 12 is fulfilled or the pressure in the pressure accumulator 3 reaches or drops below the pressure threshold before the desired level is reached, the positive-adjustment operation is interrupted prematurely, and the corresponding cross-blocking valves 5, 6a, 6b are switched back into the at-rest position shown in FIG. 1 and if necessary the compressor 12 is switched off. A particularly simple switch-off condition for the compressor 12 is a temperature of the compressor 12, which can be determined using a temperature sensor 26. The temperature of the compressor 12 is monitored on an ongoing basis by the control unit 10, so that when the switch-off condition occurs, the appropriate steps, such as switching off cross-blocking valves 6a, 6b and compressor 12, can be carried out immediately by the control unit 10. FIG. 2 provides a more detailed explanation of specifically how this happens.

If the current level is above the predetermined desired level stored in the control unit 10, the control unit 10 initiates a discharge operation. For this purpose, the corresponding cross-blocking valves 6a, 6b and the discharge valve 14 are switched as explained above. The discharge operation is terminated when the control unit 10 ascertains that the current level corresponds to the predetermined level stored in the control unit 10. The control unit 10 then moves the corresponding cross-blocking valves 6a, 6b and the discharge valve 14 back into the at-rest position shown in FIG. 1.

The situation may also arise whereby the control unit 10 ascertains that the level of the vehicle body is not lowered as expected during a discharge operation because of the motor vehicle being in a critical situation. In this case, the control unit 10 interrupts the discharge operation.

The level control system may include a pressure sensor 24, which can be used to measure the air pressure in each individual air spring 2a, 2b and the pressure accumulator 3 of the level control system. To measure the air pressure in the air spring 2b assigned to the "rear left" wheel position, the cross-blocking valve 6b assigned to this air spring 2b is moved from the at-rest position shown in FIG. 1 into the other switching position by the control unit 10, whereas all the other cross-blocking valves 6a, 6b of the level control system remain in the at-rest position shown in FIG. 1. In this case, the static air pressure which is present in the air spring 2b assigned to the "rear left" wheel position is applied to the pressure sensor 24. The air pressure in the other air springs of the level control system can be measured accordingly. The respective measurement result from the pressure sensor 24 is transmitted to the control unit 10. The transmitted measurement result is assigned in the control unit 10 to the air spring 2a, 2b whose cross-blocking valve 6a, 6b it has actuated, and is evaluated and stored.

It is also possible for air to be exchanged between the individual air springs 2a, 2b in order, for example, to compensate for a leaning position of the vehicle body. It is preferable for air exchange between only two air springs 2a, 2b to be performed simultaneously. For this purpose, the respective cross-blocking valves 6a, 6b of the corresponding air springs 2a, 2b are briefly switched simultaneously by the control unit 10 in such a way that air can flow from the air spring 2a, 2b at the higher pressure level to the air spring 2a, 2b at the lower pressure level. After the cross-blocking valves 6a, 6b have closed, it is necessary to wait for a brief time to enable pressure equalization to take place and to enable the pressure in the corresponding air springs 2a, 2b to be determined. The operation can be repeated until the vehicle body is no longer in a leaning position. A corresponding procedure can be adopted for exchanging air between the pressure accumulator 3 and an air spring 2a, 2b, in which case the cross-blocking valve 5 has to be switched.

FIG. 2 describes the sequence of the control method implemented in a control unit of a level control system of a motor vehicle with two axles. In a first step of the method, the status of the level control system is determined, in the form of the current level, the starting level N1, and stored. In a further step, a new desired level N2, which is higher than the starting level N1, is set by the driver of the motor vehicle, for example by actuating a button, or the control unit itself, for example after a positive-adjustment operation has been interrupted. The positive adjustment of the first axle 1 of the motor vehicle from the starting level N1 to the desired level N2 is then started. FIG. 1 provides a more detailed explanation of how the corresponding valves and the compressor are switched during this operation. During the positive-adjustment operation, monitoring is carried out to ascertain whether a switch-off condition of the compressor is fulfilled or whether the pressure level in the pressure accumulator is too low (pressure threshold pk). The switch-off condition may be a temperature limit (Tk), a current limit or a time limit.

If the switch-off condition is fulfilled during the positive-adjustment operation of the axle 1, for example if the temperature at or in the vicinity of the compressor is greater than or equal to a maximum limit temperature (TK>=Tmax), or if the current pressure pa in the pressure accumulator is less than or equal to the pressure threshold value pk (pa<=pk), the positive-adjustment operation of the axle 1 is interrupted. The negative-adjustment operation of the axle 1 to the starting level N1 is started. As soon as the axle 1 has reached the starting level, the negative-adjustment operation of the axle 1 is terminated. The level control system therefore reverts to its state at the start of the positive-adjustment operation of the axle 1, at starting level N1.

If the switch-off condition is not fulfilled during the positive-adjustment operation of the axle 1, for example if the temperature at or in the vicinity of the compressor is lower than a maximum limit temperature (TK<Tmax) or the current pressure pa in the pressure accumulator is above the pressure threshold value pk (pa>pk), the positive-adjustment operation of the axle 1 is terminated as soon as the desired level N2 of the axle 1 is reached. Then, the positive-adjustment operation of the axle 2 to the desired level N2 is started. In this case too, a switch-off condition, which may be a switch-off condition for the compressor (to ensure that the compressor is not irreparably damaged) or a pressure threshold value in the pressure accumulator, is determined during the positive-adjustment operation.

If the switch-off condition is fulfilled during the positive-adjustment operation of the axle 2, for example if the temperature at or in the vicinity of the compressor is greater than or equal to a maximum limit temperature (TK>=Tmax) or the current pressure pa in the pressure accumulator is less than or equal to the pressure threshold value pk (pa<=pk), the positive-adjustment operation of the axle 2 is interrupted. The control unit uses the height signals from all the height sensors to determine an intermediate level Z1 which corresponds, for example, to the current actual level of the axle 2. Then, the level at all the axles of the motor vehicle is lowered to this intermediate level Z1. For the present example, this means that the level of the axle 1 is lowered from the desired level N2 to the intermediate level Z1. For this purpose, the negative-adjustment operation of the axle 1 is started. The negative-adjustment operation of the axle 1 is terminated as soon as the intermediate level Z1 has been reached. The level control system is set to a new starting state, in which the new starting level N1 corresponds to the intermediate level Z1.

However, the intermediate level can also be set by gradually transferring air from the air springs at the higher pressure and the greater height level into the air springs at the lower pressure and the lower height level (as described in FIG. 1) until the leaning state of the vehicle body has been compensated for. In this case, no air is discharged from the air springs to the environment. This sequence is not illustrated in FIG. 2.

If the switch-off condition is not fulfilled during the positive-adjustment operation of the axle 2, for example if the temperature at or in the vicinity of the compressor is lower than a maximum limit temperature (TK<Tmax) or the current pressure pa in the pressure accumulator is greater than the pressure threshold value pk (pa>pk), the positive-adjustment operation of the axle 2 is terminated as soon as the desired level N2 of the axle 2 has been reached. Then, the level control system is set to a new starting state, in which the new starting level N1 correspond to the desired level N2.

List of Designations (forms part of the description)
2a front left (VL) or front right (VR) air spring
2b rear left (HL) or rear right (HR) air spring
3 pressure accumulator
4a cross-line
4b cross-line
5 cross-blocking valve
6a cross-blocking valve front left or right
6b cross-blocking valve rear left or right
8 line
10 control unit
12 compressor
14 discharge valve
16 height sensor front left
18 height sensor front right
20 height sensor rear right
22 height sensor rear left
24 pressure sensor
26 temperature sensor

The invention claimed is:

1. A method for level control in a pneumatic level control of a motor vehicle having at least two axles, at least one air spring (2a, 2b) per axle, a pressure supply arrangement, at least one pressure sensor (24), means for determining the distance between at least one unsprung part and the vehicle body (16, 18, 20, 22), and a control unit (10), in which the axles are successively adjusted from a starting level to a desired level, in which during a positive-adjustment operation at least from time to time the pressure supply arrangement is connected to at least one air spring (2a, 2b), and in which the positive-adjustment operation of the at least one air spring (2a, 2b) at an axle from a starting level to a higher desired level is interrupted by the control unit (10) if at least one switch-off condition of the pressure supply arrangement is met, comprising the step of adjusting the level at all the axles of the motor vehicle to a common height intermediate level, which is closer to the desired level than the starting level, so that the vehicle is no longer leaning.

2. The method as claimed in claim 1, wherein the intermediate level is determined after the positive-adjustment operation has been interrupted and before the adjustment operation to the common height intermediate level begins.

3. The method as claimed in claim 1, wherein the intermediate level corresponds to the lowest actual level of one of the axles of the motor vehicle.

4. The method as claimed in claim 1, wherein
the intermediate level is set on the basis of air exchange between air springs (2a, 2b), without air being released from the air springs (2a, 2b) of the level control system to the environment.

5. The method as claimed in claim 1, wherein the pressure supply arrangement comprises a compressor and wherein the interrupted positive-adjustment operation of the at least one air spring (2a, 2b) is continued to the desired level if a switch-on condition of the compressor (12) is fulfilled, with the intermediate level corresponding to the starting level.

6. The method as claimed in claim 5, wherein the switch-on condition of the compressor (12) is a lower limit temperature.

7. The method as claimed in claim 6, wherein the lower limit temperature is determined directly at the compressor (12) or in the vicinity of the compressor.

8. The method as claimed in claim 1, wherein the pressure supply arrangement comprises a compressor and wherein the switch-off condition of the compressor (12) is an upper limit temperature.

9. The method as claimed in claim 8, wherein the upper limit temperature is determined directly at the compressor (12) or in the vicinity of the compressor.

10. The method as claimed in claim 1, wherein the pressure supply arrangement comprises a pressure accumulator and wherein the switch-off condition is a lower pressure threshold in the pressure accumulator (3).

* * * * *